UNITED STATES PATENT OFFICE.

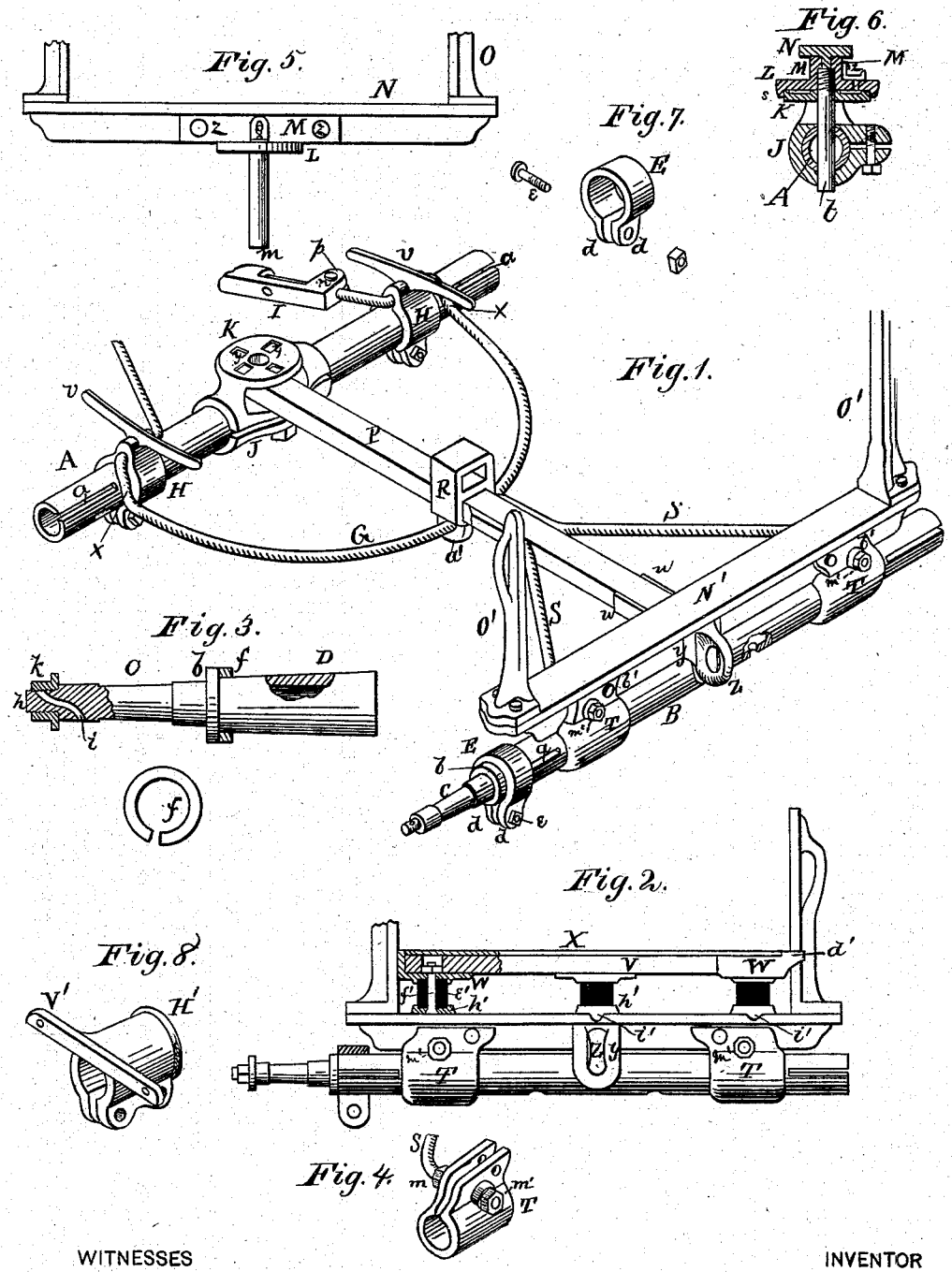

MORRIS D. BENNETT, OF HORSEHEADS, NEW YORK.

IMPROVEMENT IN RUNNING-GEARS FOR WAGONS.

Specification forming part of Letters Patent No. 186,528, dated January 23, 1877; application filed October 11, 1876.

*To all whom it may concern:*

Be it known that I, MORRIS D. BENNETT, of Horseheads, in the county of Chemung, and in the State of New York, have invented certain new and useful Improvements in Wagons; and do hereby declare that the following is a full, clear, and exact description thereof, reference being had to the accompanying drawings, and to the letters of reference marked thereon, making a part of this specification.

The nature of my invention consists in the construction and arrangement of the running-gear for lumber-wagons or other vehicles, as will be hereinafter more fully set forth.

In order to enable others skilled in the art to which my invention appertains to make and use the same, I will now proceed to describe its construction and operation, referring to the annexed drawing, in which—

Figure 1 is a perspective view of the running-gear. Fig. 2 is a rear view of the hind axle, with its bolster partly in section. Figs. 3 to 8 are detailed views of detached parts of the running-gear.

A represents the front axle, and B the hind axle, of my running-gear for vehicles. These axles are both made of tubing, of suitable dimensions, and provided at each end with a longitudinal slot, $a$, as shown, so that the extreme ends of each axle can be slightly compressed or contracted. C represents the spindle, provided with the circumferential collar or flange $b$, and on the inner side of said collar extends an arm, D, to be inserted in the end of the axle. The spindle and arm are made of one piece, and the arm is made slightly tapering, as shown in Fig. 3, it being of a trifle larger diameter at the extreme end than near the collar. E is a wrought-iron or malleable-iron band, with projecting ears $dd$ at its ends, which band is placed around the end of the axle. The arm D being then inserted in the axle up to the shoulder $b$, a bolt, $e$, is passed through the ears $dd$, tightening the band E firmly around the axle, and compressing or contracting the axle around the reduced portion of the arm D, so as to hold said arm firmly in its place in the axle. If it is desired to make the distance between the wheels on the same axle larger, one or more open rings, $f$, may be placed on the arm D, between the end of the axle and the collar or flange $b$. The outer end of the spindle C is formed with a screw, $h$, upon which the nut $k$ is screwed to hold the wheel in its place. When this nut is screwed up it covers and closes the upper end of an oil-passage, $i$, which passage extends inward and downward, as shown in Fig. 3. When it is desired to oil the spindle, a jack is simply put under the end of the axle, and this end raised till the wheel is off the ground, when, by unscrewing the nut $k$, the oil can be poured in, and the wheel being whirled around on the spindle, the oil is distributed over the entire surface of the spindle without taking off the wheel. The hounds G of the wagon are made of one piece of iron rod, bent in semicircular form, as shown in Fig. 1, and the ends then bent inward and passed from the outside to the inside at the top of the band or clip H, and the extreme ends project inward and forward. The bands or clips H are each made of a single piece of wrought-iron or malleable iron, and fastened by a single bolt passing through ears at its ends, the same as described for the bands E. In the center of the band H, on the inside, is formed a groove, in which the hound lies. The tongue of the vehicle is to be secured to two bars, I, placed on the projecting ends of the hounds in the following manner: Each bar I has at its forward end, on the outer side, a projecting socket, $m$, into which the extreme end of the hound is inserted. From the bar I project, also, one or more pairs of grooved jaws, $n$ $n$, which clamp the projecting end of the hound, and are firmly fastened by a bolt, $p$, passing through the ends of the jaws.

In the construction of the hounds G, the iron rod of which they are made is bent at the outer side of each clip or band H downward against the axle, as shown at $x$ $x$ in Fig. 1, so as to act as a brace near each end of the axle. In the center of the axle A is fastened a clamp, J, constructed to form an elevated disk, K, which constitutes the lower half of the fifth-wheel of the vehicle. In the top of this disk are suitable oil-recesses $y$ $y$. The upper half of the fifth-wheel is composed of a disk, L, provided with a circumferential flange, $s$, which encircles the disk K, as seen in Fig. 6. On the top of the disk L are formed two bars, M M, leaving a groove or recess between said bars.

N represents the front bolster, made of T-iron, and provided at each end with a metal standard, O, firmly bolted to it. The center bar of the T-bolster is inserted between the bars M M, and firmly bolted to the same by bolts $z\ z$, as seen in Figs. 5 and 6. From the center of the disk L projects the king-bolt $t$, which is passed downward through the disk K, front end of the reach P, clamp J, and axle A, the ends of the bolster N resting upon curved guides $v\ v$, attached to the bands or clips H. The rear end of the reach P is firmly bolted between flanges $w\ w$, projecting in front of the rear bolster N', and the reach passes through a socket or holder, R, to the front axle, where it is held, as stated, by the king-bolt $t$. The socket or holder R is formed with a loop, $a'$, on its under side, through which the hounds G pass; and it has also two slots or openings for the passage of the reach, so that, when required, the reach can be spliced for extending the wagon. The reach P has secured to it on each side a brace-rod, S, which extends outward and rearward, and the rear end thereof passes through the ends of a band or clip, T, above the rear axle B, the clip being placed around said axle. This band or clip is formed at its end with flanges $b'$, between which the hind bolster is inserted and firmly bolted. This bolster is also provided with standards O' at its ends. On either one or both of the bolsters I use a bar, V, provided at each end with a casting, W, and covered by a plate, X. The castings W have at their outer ends projecting lips $d'$, forming dovetailed grooves to pass over the wagon-standards. The bar V is supported upon springs $e'$, which rest upon plates $h'$, having lips or flanges $i'$, to project in front and rear of the bolster, and keep the plates in place on the bolster. Each plate $h'$ is connected to the bar V by a pin or screw, $f'$, passing through the center of the spring $e'$, and so arranged in the bar that it can move up and down therein as the spring contracts or expands. On each brace S above mentioned are two nuts, $m'\ m'$, one on each side of the clip or band T, to hold the brace, and consequently the reach, perfectly rigid. The flanges $w\ w$, between which the reach is fastened, and which project in front of the rear bolster, are formed in one casting, Y, fitting between the hind axle and hind bolster. This casting is made to lap over the rear of said axle, and is formed with an eye or loop, Z, for convenience when desired to hook anything to the rear of the wagon.

In case it should be desired to use wooden hounds in place of the hounds G, as above described, the bands or clips H H are dispensed with, and in their places I use the bands H', (shown in Fig. 8,) which are provided with inclined flanges $v'$, for bolting the hounds to.

Having thus fully described my invention, what I claim as new, and desire to secure by Letters Patent, is—

1. The combination of the tubular axle, with longitudinal slot $a$ at each end, the spindle-arm D, made slightly tapering, and the clip or band E, fastened by one or more bolts, substantially as set forth.

2. The spindle C, provided with the oil-passage $i$, in combination with the wheel-retaining nut $k$, for closing the upper outer end of said passage, as herein set forth.

3. The hounds G, formed of a single rod, bent as shown, forming braces at $x\ x$, and fastened to the axle by the clips or bands H, substantially as shown and described.

4. The bar I, provided with socket $m$ and one or more pairs of jaws, $n$, in combination with the hounds G and one or more bolts, $p$, as and for the purposes set forth.

5. In combination with the tubular axle A, the clamp J, surrounding the same and having elevated disk K, provided with oil-recesses $y$, and the top disk L, having downwardly-projecting circumferential flanges $s$, as herein shown and described.

6. The combination of the disk L, with bars M M, formed of one piece, and the T-bolster N, secured together by bolts $z\ z$, as shown and described.

7. The combination of the holder R, with eye or loop $a'$, the hounds G, and reach P, substantially as herein set forth.

8. The combination of the hind axle B, bands or clips T, with flanges $b'$, bolster N', reach P, and braces S S, with nuts $m'\ m'$, substantially as herein set forth.

9. The casting Y, with flanges $w\ w$, in combination with the hind axle, bolster, and reach, substantially as herein set forth.

10. The combination of the bar V, castings W, with lips $d'$, the springs $e'$, plates $h'$, and rods or pins $f'$, substantially as herein set forth.

In testimony that I claim the foregoing I have hereunto set my hand this 28th day of September, 1876.

MORRIS D. BENNETT.

Witnesses:
C. L. EVERT,
E. C. WEAVER.